Oct. 31, 1961  A. HELLER  3,006,074
DATA PROCESSOR AND COMPUTER
Filed Dec. 30, 1958  2 Sheets-Sheet 1
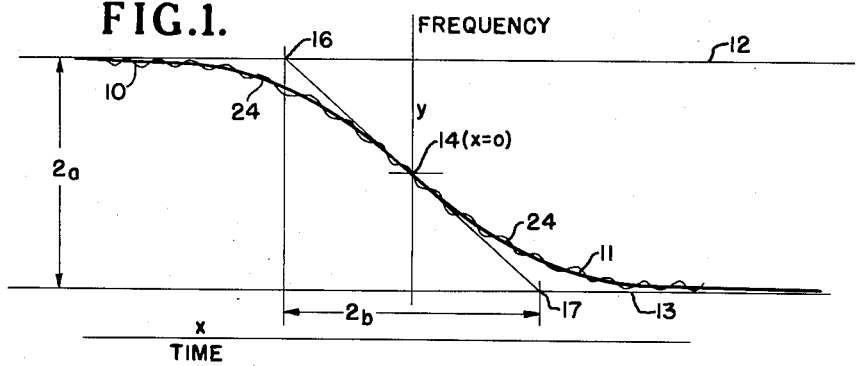
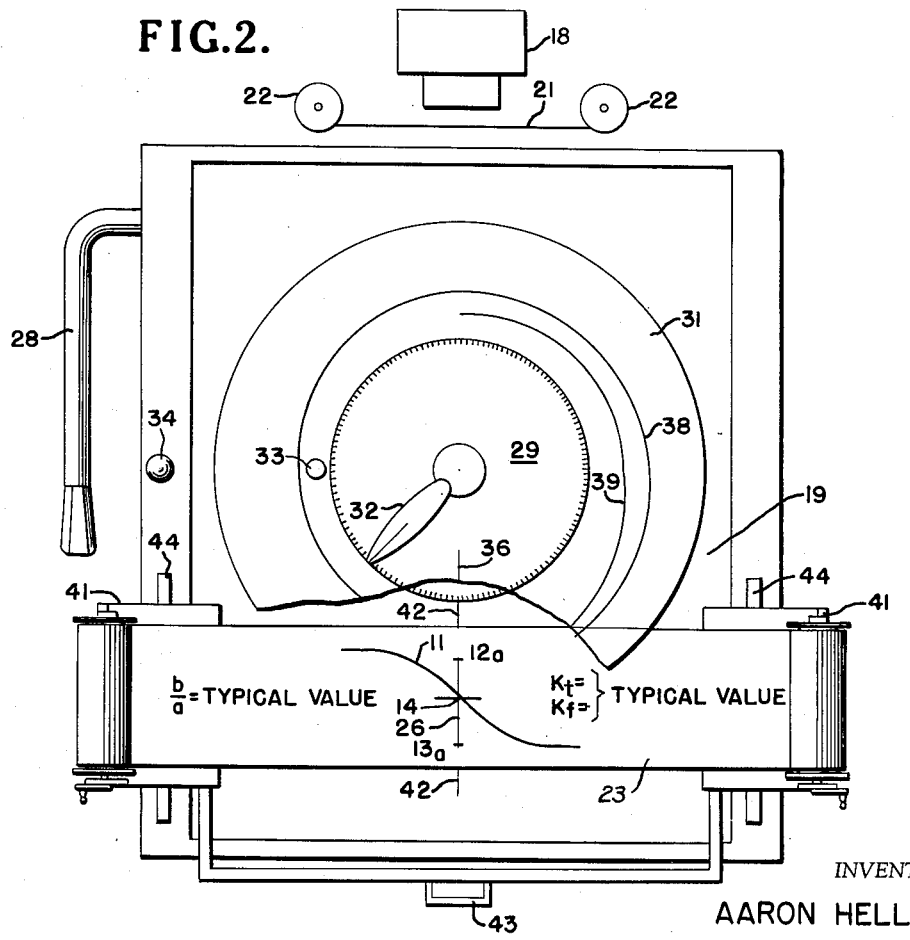
INVENTOR.
AARON HELLER

INVENTOR.
AARON HELLER

United States Patent Office 3,006,074
Patented Oct. 31, 1961

3,006,074
DATA PROCESSOR AND COMPUTER
Aaron Heller, Silver Spring, Md., assignor to the United States of America as represented by the Secretary of the Navy
Filed Dec. 30, 1958, Ser. No. 784,004
5 Claims. (Cl. 33—1)
(Granted under Title 35, U.S. Code (1952), sec. 266)

The invention described herein may be manufactured and used by or for the Government of the United States of America for governmental purposes without the payment of any royalties thereon or therefor.

This application relates to a method and apparatus for processing data, and more particularly to a method and apparatus for determining the parameters of an experimental curve by comparison with members of a family of theoretical curves and by analyzing the theoretical curve which matches the experimental curve.

In order to more clearly explain the principles of this invention, it will be described with reference to a particular system of data analysis. In a missile-miss-distance-indicating-system, experimental data is presented as a continuous curve which, upon analysis, yields information indicative of the missile speed relative to the target and the miss distance.

Prior to this invention, such experimental data traces were analyzed by a mechanical curve plotter such as described in the patent application of R. E. Grantham et al. S.N. 759,107 for a Doppler Frequency Curve Plotter filed September 4, 1958, and assigned to the assignee of this application. The mechanical method of analyzing a Doppler frequency curve comprises, fitting an experimental curve to a theoretical curve by tracing over it with a stylus while progressively adjusting parameter controls until a good fit is made. Although such mechanical curve plotters are sufficiently accurate, they operate slowly since it is impossible to view the entire theoretical curve as the parameters are varied. Therefore, the complete experimental curve cannot be compared with a complete theoretical curve until after a theoretical curve is traced. That is to say each experimental curve is drawn at the time of the comparison. After the required curve parameters are determined, they are inserted into appropriate formula to compute the miss distance and missile speed relative to the target. The required computation prolongs an already long procedure and, therefore, is especially undesirable where a great number of miss distance calculations must be performed quickly.

Accordingly, it is an object of this invention to provide a new and improved data processor and computer system for fitting an experimental curve to a theoretical curve which system permits simultaneous viewing of complete curves to expedite the curve fitting process.

Another object is the provision of apparatus for transferring parameters from a curve directly to a computer to provide rapid analysis of the curve.

Still another object is the provision of an apparatus for presenting an infinite number of theoretical curves for comparison with an experimental curve, which apparatus requires only a small number of prior prepared theoretical curves.

A further object is the provision of a method of analyzing an experimental curve.

A still further object is the provision of a combination of curve matching apparatus and a computing mechanism cooperating with said apparatus to permit analysis directly from the selected theoretical curve.

These and many other objects will become more readily apparent when the following specification is read and considered along with the attendant drawings wherein like numerals designate like or similar parts throughout the several views and in which:

FIG. 1 is a plot of a typical Doppler frequency curve to be analyzed;

FIG. 2 is a plan view of the apparatus utilized to analyze the curves of FIG. 1 in accordance with the principles of this invention and with parts broken away for the sake of clarity;

Figure 3:
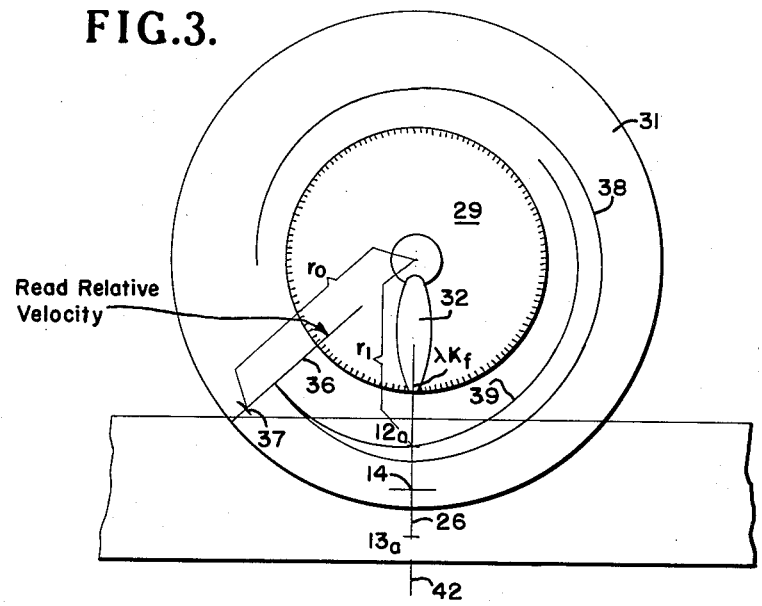
FIG. 3 is a view showing portions of the apparatus of FIG. 2 at one step in the analyzation process.

The use of this invention in analyzing a Doppler frequency curve may be better understood after a discussion of the equations which define these curves.

When a source of electromagnetic energy moves relative to an object which reflects or receives the electromagnetic energy, the frequency of the electromagnetic energy reflected or received by the object at any instant is shifted an incremental amount proportional to the instantaneous radial component of velocity between the source and object, such phenomenon being commonly referred to in the electronics art as the Doppler frequency-shift effect. Inasmuch as the instantaneous radial component of velocity between a moving source of energy and object is dependent upon the instantaneous distance therebetween, the Doppler frequency shift is also a function of the distance between source and object. The Doppler frequency shift at any given instant, for an electromagnetic energy source approaching and passing an object, is determined by the equation:

$$(1) \qquad f_{Da} = \frac{V_r \cos \theta}{\lambda_D}$$

where $f_{Da}$ is the Doppler frequency shift. $V_r$ is the magnitude of the relative velocity vector.

$\theta$ is the angle between the line from the source to object and the relative velocity vector.

$\lambda_D$ is the wavelength of the electromagnetic energy from the source.

Since the angle $\theta$ is a function of the shortest distance between the source and object and is continuously changing as the source approaches and passes by the object, the angle $\theta$ may be represented in coordinates of time. The curve of Doppler frequency versus angle $\theta$ in rectangular coordinates is represented by Equation 1. The $\cos \theta$ term of Equation 1 is converted into vector components from the geometry of the moving source-moving object intercept and substituting the vector equivalent of $\cos \theta$ in Equation 1 to transform Equation 1 to:

$$(2) \qquad f_{Da} = \frac{-V_r}{\lambda_D} \frac{(t-t_d)}{\sqrt{(t-t_d)^2 + \left(\frac{D}{V_r}\right)^2}}$$

where $t$ and $t_d$ represent respectively instantaneous time, and time at closest approach between the moving object and the moving source and D is the distance between the moving object and the moving source at the time of closest approach.

Since the coordinate scale factors of the curve represented by Equation 2 vary with changes in relative velocity and in the distance between moving object and moving source, the variable coordinate parameters of Equation 2 may be ascertained and utilized to determine relative velocity, the distance between source and object at the time of closest approach (miss distance between a moving target and moving projectile), and the time of closest approach with respect to a reference instant of time.

The analysis of Doppler-frequency curves is useful in ordnance evaluation to provide highly accurate data concerning the shot distribution of anti-aircraft gunnery and the accuracy of fire control systems and VT fuzes. In order to obtain Doppler-frequency versus time characteristics, the procedure generally employed consists of firing a projectile, which carries a continuous wave transmitter, toward a target-aircraft on which is mounted a receiver including circuitry for determining the instantaneous Doppler-frequency shifts recorded as a function of time on a recorder that is synchronized with the projectile-launching station fire control system to produce a Doppler-frequency versus time record trace for the particular projectile-target intercept under evaluation. Since recorder deflection sensitivity and speed of the recorder paper are involved during the operations of the recorder, these factors are introduced into the recorded Doppler-frequency versus time curve and its representative Equation 2, thereby resulting in a record trace defined by the equation:

$$(3) \quad \frac{f_{pa}}{K_f} = \frac{-V_r}{K_f \lambda_p} \frac{K_t(t-t_d)}{\sqrt{K_t^2(t-t_d)^2 + \left(\frac{K_t D}{V_r}\right)^2}}$$

where $K_f$ is the recorder deflection sensitivity in cycles per second per unit length and where $K_t$ is the velocity of the photographic film or paper in the recorder in unit length per second.

Expressing Equation 3 in X and Y coordinates, Equation 3 takes the form:

$$(4) \quad Y = \frac{-V_r}{K_f \lambda_p} \frac{X}{\sqrt{X^2 + \left(\frac{K_t D}{V_r}\right)^2}}$$

where Y is the vertical frequency dimension and is given by the equation:

$$(5) \quad Y = \frac{f_{pa}}{K_f}$$

and where X is the horizontal time dimension and is given by equation:

$$(6) \quad X = K_t(t-t_d)$$

Equation 4 is the general equation, in rectangular coordinates, of the recorded Doppler-frequency versus time curves.

In lieu of recording the Doppler-frequency versus time curves on the target-aircraft as aforedescribed, it is the usual practice to employ a transponder on the target-aircraft to telemeter the Doppler frequencies to the launching station where they are recorded to produce a Doppler-frequency versus time curve. A highly refined telemetering system for obtaining Doppler-frequency versus time curves is described and claimed in the copending application of R. E. Grantham et al., Serial No. 759,106, filed September 4, 1958, assigned to the same assignee of the instant application. Miss distance, relative velocity between target-aircraft and projectile, and the time of closest approach are determined by analysis of the recorded Doppler-frequency versus time curves obtained in any of the aforedescribed manners and defined by Equation 4.

In carrying out the present invention in its basic form, a pair of arbitrary parameters, $a$ and $b$, are substituted into Equation 4 resulting in an equation having the form:

$$(7) \quad Y = -\frac{aX}{\sqrt{X^2 + b^2}}$$

where:

$$(8) \quad a = \frac{V_r}{\lambda_p K_f}$$

$$(9) \quad b = \frac{K_t D}{V_r}$$

It is to be noted that, if Equations 5, 6, 8 and 9 are substituted into Equation 7, the resultant is Equation 3 which is the equation of the Doppler-frequency versus time curves. Thus Equation 7 is the general equation of the Doppler-frequency versus time curves. The present invention is directed to a curve analyzer and computer which matches a theoretical curve defined by Equation 7 to an experimental curve and which determines the miss distance and relative velocity between a moving target and projectile from the parameters $a$ and $b$.

After the appropriate theoretical curve is selected and matched with the experimental curve, the relative velocity and the miss distance are computed by solving Equations 8 and 9 for $V_r$ and D $$(10) \quad V_r = a \lambda_p K_f$$

$$(11) \quad D = \frac{bV_r}{K_t} = ab\lambda_p \frac{K_f}{K_t}$$

It is understood that $K_f$ and $K_t$ are constant for any one roll of record, and are set in the field at the time the record is made.

Equations 10 and 11 may be written as:

$$(12) \quad V_r = f(a) = (\lambda_p K_f) a$$

and $$(13) \quad D = f\left(a^2 \frac{b}{a}\right) = (\lambda_p K_f) a^2 \left(\frac{b}{a}\right) \frac{1}{K_t}$$

Reference may now be had to the theoretical Doppler frequency curve illustrated in FIG. 1.

Time is plotted along the X axis of the curve and frequency along the Y axis. An experimental curve 10 is shown matched to a selected theoretical curve 11. The theoretical Doppler frequency curve 11 approaches asymptote 12 at one end and asymptote 13 at the other end. The asymptotes are parallel and spaced apart a distance of "2a," "a" being one of the arbitrary constants referred to hereinbefore. The Y axis passes through the curve 11 midway between asymptotes 12 and 13 at point 14 on the curve. This corresponds to the time when the missile and target are at their closest point of approach and the Doppler effect reverses as the object and the missile commence to recede from each other. A tangent to curve 11 at 14, intercepts the asymptotes at 16 and 17 so that the distance from 16 to 17 measured in the X direction is "2b." Therefore, the slope of the curve at 14 is $$-\left(\frac{a}{b}\right)$$

As indicated in FIG. 2 the apparatus embodying the principles of the invention comprises an autofocus microfilm reader such as a Recordak, Library Film Reader, Model C suitably modified to make it useable as a comparator 19 for practicing this invention. A projector 18 is mounted upon comparator 19 and a film 21 upon which is prerecorded a plurality of theoretical curves is wound between rolls 22 so that the film passes through the projector. The slope of successive theoretical Doppler frequency curves at point 14 is progressively altered, accordingly the ratio $a/b$ varies from curve to curve. The numerical value of $b/a$ is printed on each curve so that this value may be instantly seen by inspection and employed in the computation as described hereinafter.

A roll of recording paper 23 containing at least one experimental curve 10 obtained in the manner described in the aforementioned copending application of R. E. Grantham et al. is disposed over the face of comparator. The usual projection screen is removed from the comparator so that an image of the selected theoretical curve 11 is projected onto the recorder paper 23 and superimposed upon the experimental trace 10. Numerical values of $K_f$ and $K_t$ observed during the recording of the particular experimental curve undergoing analysis are printed on paper 23 near the experimental curve to aid in the analysis of the curve 10.

By a process of judicious selection an appropriate theoretical curve having a known ratio of $a/b$ (slope at point 14) may be fitted to the slope of the experimental curve at the corresponding point. This procedure may be quickly accomplished since all that is required is to match the slope of the more or less straight portion of the curves between the bends 24. Furthermore, both of the curves are visible in their entirety during this procedure.

As indicated in FIG. 2 each theoretical curve has printed thereon a line 26 of unit length. This line passes through midpoint 14 of curve 11 and is perpendicular to and terminates at the asymptotes which are indicated by 12a and 13a in FIG. 2.

Having selected a theoretical curve having a slope at 14 coincident with that of the experimental curve, the operator adjusts the magnification of the theoretical curve by operating lever 28. This serves to fit the curves at the bends 24 (see FIG. 1). It should be noted that "$b$" and "$a$" are thereby changed proportionally so that the slope $a/b$ is not altered by adjusting the magnification. The values of "$a$" and "$b$" of course are changed; this, in effect, produces a new theoretical curve according to the rule of Equations 12 and 13. Accordingly, there is available an infinite number of theoretical curves that may be selected and matched to the experimental curve in spite of the fact that only about 50 prerecorded theoretical curves are employed. This use of an autofocus comparator to provide an unlimited number of theoretical curves is an important feature of this invention.

In the event that the slope of the curves no longer match after magnification of the theoretical curve, a new prerecorded curve is selected by the foregoing procedure and the magnification of the new theoretical curve is adjusted to fit the experimental curve. Experience has shown that a trained operator originally selects within one curve of the appropriate theoretical curves and invariably selects the correct theoretical curve on the second attempt. A novice sometimes requires three curve matchings before this is achieved.

After theoretical curve 11 is matched to the experimental curve 10, the latter curve is not needed for further computations and may be disregarded. The theoretical curve contains no noise or other extraneous signals and is easier to work with than the experimental curve which invariably contains spurious signals superimposed upon the Doppler frequency curve.

A computing device comprising a conventional logarithmically divided circular slide rule 29 is rotatably mounted on comparator 19. A transparent converter disc 31 is rotatably mounted concentrically over slide rule 29 and is frictionally engaged therewith while a portion of disc 31 overlays the recorder paper 23 which contains the experimental curve and a projection of the matching theoretical curve. Mounted over and coupled frictionally to converter disc 31 is a rotatable cursor 32.

A movable clamp 33 is positioned on the comparator adjacent to the edge of slide rule 29. This clamp is preferably composed of resilient material and is connected by suitable linkage (not shown) to push button 34 so that the clamp may be engaged with slide rule 29 to immobilize it by pushing the button 34.

The portion of disc 31 overlaying recorder paper 23 is cut away in FIG. 2 to prevent confusion between the several coincident lines on disc 31, slide rule 29, and recorder paper 23. Disc 31 is shown in its entirety in FIGS. 3 and 4, however. Engraved on disc 31 are a radial reference line 36 and a converter index 37 perpendicular to line 36. Two spiral engravings 38 and 39 begin at line 36, spiral 38 is a plot of $\phi=(\log l^2)$ and 39 is a plot of $\phi=(\log l)$ where $l=(r_0-r_1)$ and $r_0=$the radial distance from the center of disc 31 to the converter index 37 at intersection with reference line 36 ($\phi=0$) and $r_1=$the radius of the curve at any angle $\phi$.

As stated hereinabove, each theoretical curve contains a reference line 26 extending perpendicularly from asymptote 12 to asymptote 13 through midpoint 14 of the theoretical curve 11. The magnification of curve 11 changes the length of line 26 proportionately thereby simplifying the introduction of the magnified value of "$a$" into the computations without the necessity of determining the numerical value of "$a$."

*Calculation process*

A vertical reference line 42 formed on the face of comparator 19 is initially aligned with the reference line 26 on theoretical curve 11, and reference line 36 on disc 31. By manipulating rod 43, reels 41 and recorder paper 23 are moved as a unit along tracks 44 so that the midpoint 14 of curve 11 coincides with the intersection of converter index 37 and reference line 36 on converter disc 31. Disc 31 is rotated counterclockwise until the numerical value of $(\lambda_p K_f)$ on the slide rule frictionally coupled to disc 31 is aligned with vertical reference line 42 on comparator 19; the slide rule is now clamped in place and held during the remainder of the computations by depressing button 34. The value of $\lambda_p K_f$ is of course known to the operator.

The converter disc 31 is rotated to align curve 39 with the top of line 26 on the theoretical curve 11. This step inserts the value of "$a$" into Equation 10 $V_r=a\lambda_p K_f$ since the distance between the midpoint 14 of curve 11 and the end of line 26 is "$a$," therefore, in the equation of spiral 39, $\phi=\log l$; $l$ has been set equal to "$a$." Furthermore, this value of "$a$" accounts for the magnification factor introduced into the solution of Equation 10 during the curve fitting process. The value of relative velocity $V_r$ on slide rule 29 may be read under reference line 36 on the transparent converter disc 31 as indicated in FIG. 3.

Figure 4:
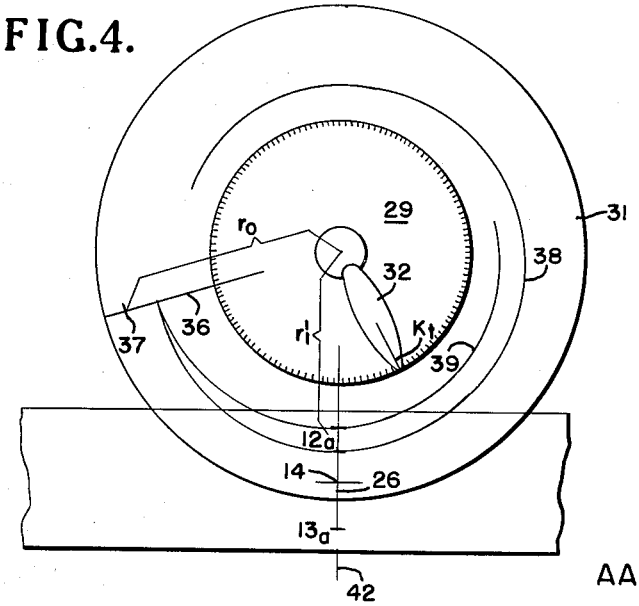
FIG. 4 is a view showing portions of the apparatus of FIG. 2 at a further step in the process.

The next portion of the procedure is to obtain a value of miss distance "D" in accordance with Equations 11 and 13 from the setting used to obtain $V_r$. The converter disc 31 is rotated to align a point on curve 38 $\phi=\log l^2$ with the top of line 26 on the projected theoretical curve. Converter disc 31 is held in place by hand and cursor 32 is superimposed over the value of $K_t$ on slide rule 29. Converter disc 31 is then rotated clockwise as seen in FIGS. 2–4 to align the frictionally coupled cursor 32 with the numerical value of $b/a$ on rule 29. As stated hereinbefore the value of $b/a$ is printed on each theoretical curve and therefore is projected onto the experimental curve paper. The effect of this step is to multiply $b/a$ times $(a^2\lambda_p K_f)$ and to divide by $K_t$ which results in $$\left(ab\lambda_p \frac{K_f}{K_t}\right)$$

the value of the miss distance according to Equation 11, which value may be read under the reference line 36 on disc 31.

It should be apparent to one skilled in the art that the apparatus may be modified by changing the engravings on the converter disc and/or altering the theoretical curves on film 21 in order to adopt the device to analyze different experimental data presented as a curve which obeys a known theoretical equation.

The process and apparatus embodying the principles of this invention may be utilized in a number of applications and may be modified without departing from the spirit of this invention. Accordingly, this invention is not to be construed as limited in any way by the specific embodiment described hereinbefore but is defined only by the scope of the appended claims.

What is claimed as new and desired to be secured by Letters Patent of the United States is:

1. A data processor and computer for determining at least one parameter of an experimental curve comprising: a film having photographed thereon a series of curves of progressively changing slope at a predetermined point on each curve, a plurality of reference lines each intersecting said predetermined point on each of the respective curves, each line terminating at a distance from the intersection correlative to the parameter of the theoretical curve, a projector receiving said film for projecting an image of a selected theoretical curve, a recording paper having an experimental curve recorded thereon, means supporting said paper in a position to receive a projected image of the selected theoretical curve superimposed on said experimental curve so that the slope of the selected theoretical curve at the predetermined point coincides with the slope of the experimental curve, means for continuously altering the projected size of said theoretical curve to adjust the parameter of the theoretical curve being determined and match said theoretical curve with the experimental curve, a logarithmic scaled circular slide rule having an index, a rotatable transparent converter disc mounted coaxially with said slide rule and overlaying a portion of said recorder paper, a radial reference line on said disc initially aligned with said slide rule index, a converter index on said radial reference line and means for aligning the converter index with the intersection of the theoretical curve with the reference line on the selected theoretical curve, a spiral engraved on said disc beginning at said radial reference line at a predetermined distance from said converter index, the shape of said spiral being such that the logarithm of the difference between the distance from the center of the disc to the converter index and the distance from any point on said curve to the center of the disc is correlative to the angle between said radial reference line and a radial line passing through the point on said spiral, whereby said radial reference line is aligned with the numerical value of the parameter on said slide rule when said disc is rotated to align a point on said spiral with the termination of the projected reference line on the theoretical curve.

2. A calculator comprising a slide rule having marked thereon a circular logarithmic scale, a transparent disc rotatably mounted on said slide rule, a radial reference having an index point formed on said disc, and a spiral intersecting said radial reference line, said spiral being so constructed that the angle between the radial reference line and a radial line to any point on the spiral is a logarithmic function of the distances from the point on the spiral and from the index point respectively to the center of said disc, a recorder strip disposed beneath said transparent disc and having inscribed thereon a curve to be evaluated, adjustable means for varying the position of said strip to align a preselected portion of the curve with a predetermined point on said radial reference line.

3. The process of obtaining a parameter of a curve derived by enlarging a curve of a known parameter comprising: enlarging a reference line of length correlative to said parameter by an amount equal to the enlargement of said curve, aligning a preselected point of said curve with a predetermined point on a transparent disc, transferring the enlarged reference line to a slide rule frictionally coupled to the disc to provide a multiplication factor for determining said parameter.

4. A data processor and computer for solving the equation of an experimentally derived curve and eliminating spurious signals on said curve comprising: a film having recorded thereon a series of presolved theoretical curves each having a reference line of fixed length thereon, a recorder paper having an experimental curve thereon, means for selectively projecting one of the series of theoretical curves onto the experimental curve, means for varying the enlargement of a projected theoretical curve to make it coincide with the experimental curve, a circular slide rule having a peripheral logarithmic scale thereon, a transparent disc rotatably mounted coaxial with said slide rule and overlaying the projected experimental curve, a radial reference line on said disc and an index on said radial reference line, a spiral delineated on said disc defined by $\phi = \log(r_0 - r_1)$ where $r_0$ is the length of said radial reference line between the center of the disc and said index, $r_1$ is the length of a radial line between a point on said spiral and the center of the disc and $\phi$ is the angle subtended between said radial reference line and said last named radial line, adjustable means supporting said recorder paper for aligning a point on the line on the projected theoretical curve with said index so that rotation of said disc to bring a point on said spiral curve into alignment with an end of the line on the projected theoretical curve moves said radial reference line along the slide rule scale to automatically compensate for alteration in the projected theoretical curve.

5. A data processor and computer comprising: a film having a series of theoretical Doppler frequency curves of known parameters "$a$" where $a$ is a function of the velocity vector of a moving source of electromagnetic energy and the wave length of the electromagnetic energy and "$b$" photographed thereon, said series of curves having progressively varying known slopes $a/b$ at a point on each curve corresponding to the inflection point at which the Doppler effect reverses, a plurality of markers on each of said theoretical curves, one of said markers at said inflection point and a second marker spaced a distance "$a$" therefrom, a projector receiving said film for selectively projecting an image of one of said theoretical curves, a recording paper having an experimental Doppler frequency curve recorded thereon, said paper receiving a projected image of a theoretical curve superimposed on the experimental curve to match the slope of a theoretical curve with that of the experimental curve at their respective inflection points, means for continuously altering the projected size of said theoretical curve to adjust the parameters of said theoretical curve and match said theoretical curve with the experimental curve, a rotatable logarithmic scaled circular slide rule having an index, means adapted to engage said slide rule to selectively lock said rule against rotation thereof, a rotatable transparent converter disc mounted coaxially with said slide rule and overlaying a portion of said recorder paper, said disc frictionally engaging said slide rule, a radial reference line on said disc initially aligned with said slide rule index, a converter index on said radial reference line, adjustable means carrying said recorder paper for initially aligning the inflection point on said projected theoretical Doppler frequency curve with the slide rule index and said converter index, a first spiral engraved on said disc, said spiral being so shaped that the logarithm of the difference between the length of radial reference line between the center of said disc and said converter index and the length of radius from the center of said disc to any point on said curve is correlative to the angle between said radial reference line and said radius whereby rotation of said disc while said slide rule is locked in alignment with said inflection point to a position where a point on said spiral coincides with the second marker on said theoretical curve aligns said reference line with the numerical value of parameter "$a$" of the projected theoretical curve on said slide rule, a second spiral curve on said disc shaped so that the logarithm of the square of the difference between the length of radial reference line between the center of said disc and said converter index and the length of a radius from the center of said disc to any point on said curve is correlative to the angle between said radial reference line and said radius, whereby the value of $a^2$ may be inserted onto said slide rule for use with the known value of the reciprocal of slope $$\left(\frac{b}{a}\right)$$

to provide the value of parameter $ab$.

References Cited in the file of this patent

UNITED STATES PATENTS

| | | |
|---|---|---|
| 752,617 | De Pue | Feb. 16, 1904 |
| 1,200,569 | Young | Oct. 10, 1916 |
| 2,643,576 | Merriam | June 30, 1953 |
| 2,750,671 | Jones | June 19, 1956 |

FOREIGN PATENTS

| | | |
|---|---|---|
| 292,223 | Great Britain | June 14, 1928 |